United States Patent
Saarelainen et al.

(10) Patent No.: US 9,261,151 B2
(45) Date of Patent: Feb. 16, 2016

(54) ELECTROMAGNETIC BRAKE

(71) Applicant: KONE Corporation, Helsinki (FI)

(72) Inventors: Antti Saarelainen, Espoo (FI); Asmo Tenhunen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 14/024,321

(22) Filed: Sep. 11, 2013

(65) Prior Publication Data

US 2014/0008159 A1    Jan. 9, 2014

Related U.S. Application Data

(63) Continuation of application No. PCT/FI2012/050257, filed on Mar. 19, 2012.

(30) Foreign Application Priority Data

Mar. 24, 2011 (FI) ...................................... 20115282

(51) Int. Cl.
| | |
|---|---|
| *B60T 13/00* | (2006.01) |
| *F16D 63/00* | (2006.01) |
| *B66D 5/08* | (2006.01) |
| *B66D 5/30* | (2006.01) |
| *H01F 5/04* | (2006.01) |
| *F16D 121/18* | (2012.01) |
| *F16D 121/22* | (2012.01) |

(52) U.S. Cl.
CPC ................. *F16D 63/002* (2013.01); *B66D 5/08* (2013.01); *B66D 5/30* (2013.01); *H01F 5/04* (2013.01); *F16D 2121/18* (2013.01); *F16D 2121/22* (2013.01)

(58) Field of Classification Search
CPC . F16D 2121/20; F16D 2127/12; F16D 51/48; F16D 57/002; F16D 63/002; F16D 2121/18; F16D 2121/22; B66D 5/08; B66D 5/30; H01F 5/04
USPC .................... 303/20; 188/158–161, 171, 173; 335/296, 297, 299; 336/83, 96, 107, 336/192, 196, 198, 199, 205, 208
See application file for complete search history.

(56) References Cited

U.S. PATENT DOCUMENTS

| | | | | |
|---|---|---|---|---|
| 2,999,962 | A | * | 9/1961 | Wahl .............................. 335/299 |
| 3,328,736 | A | * | 6/1967 | Keck .............................. 336/192 |
| 3,753,182 | A | | 8/1973 | Grove |
| 3,760,909 | A | * | 9/1973 | Grove ........................... 188/138 |
| 4,172,242 | A | * | 10/1979 | Myers et al. .................. 335/209 |

(Continued)

FOREIGN PATENT DOCUMENTS

| | | |
|---|---|---|
| CN | 1170097 A | 1/1998 |
| CN | 1745256 A | 3/2006 |

(Continued)

*Primary Examiner* — Pamela Rodriguez
(74) *Attorney, Agent, or Firm* — Birch, Stewart, Kolasch & Birch, LLP

(57) ABSTRACT

An electromagnetic brake and a method for manufacturing an electromagnetic brake are disclosed. The electromagnetic brake includes a coil former, a coil, which is fitted on the coil former, and also an electrically connecting part, which is equipped to make an electrically conductive contact between the coil and the power supply cable supplying current to the electromagnetic brake.

7 Claims, 1 Drawing Sheet

(56) References Cited

U.S. PATENT DOCUMENTS

| | | | | |
|---|---|---|---|---|
| 4,216,849 | A | * | 8/1980 | Neill .................... 188/138 |
| 5,132,655 | A | * | 7/1992 | Suzuki et al. ............ 336/192 |
| 5,368,138 | A | | 11/1994 | Kuivamaki |
| 5,433,297 | A | | 7/1995 | Kuivamaki |
| 5,570,075 | A | | 10/1996 | Krimmer et al. |
| 5,796,324 | A | * | 8/1998 | Ross et al. ............... 336/192 |
| D455,715 | S | * | 4/2002 | Sakai et al. .............. D13/118 |
| 2006/0077026 | A1 | | 4/2006 | Chung |

FOREIGN PATENT DOCUMENTS

| | | |
|---|---|---|
| CN | 101115937 A | 1/2008 |
| FI | 113107 B | 2/2004 |
| GB | 1 454 857 | 11/1976 |
| JP | 5-256330 A | 10/1993 |
| JP | 7-245909 A | 9/1995 |
| JP | 2007-261725 A | 10/2007 |
| JP | 2011-26095 A | 2/2011 |
| KR | 10-0644003 B1 | 11/2006 |

* cited by examiner

ELECTROMAGNETIC BRAKE

CROSS REFERENCE TO RELATED APPLICATIONS

This application is a Continuation of International Application No. PCT/FI2012/050257 filed on Mar. 19, 2012, which claims priority under 35 U.S.C 119(a) to Application No. 20115282 filed in Finland on Mar. 24, 2011, all of which are hereby expressly incorporated by reference into the present application.

FIELD OF THE INVENTION

The invention relates to electromagnetic brakes, more particularly to the structure and placement of the coil former of a coil of an electromagnet of a brake.

BACKGROUND OF THE INVENTION

Elevators generally comprise a holding brake, which is used to keep the elevator car in its position when the car has stopped at a floor level. Usually an electromagnetic e.g. drum brake or disc brake is used as a holding brake.

Conventionally a drum brake is used in elevators, which drum brake comprises at least an active part provided with a brake pad and with an actuator moving the brake pad, and a brake drum, being a passive part, connected to the rotor of the hoisting motor in the hoisting machine and rotating along with said rotor, on the outer rim of which brake drum is a braking surface. The drum brake of an elevator generally operates such that when the brake is closed, the spring comprised in the active part of the brake presses the brake shoe and the brake pad connected to it against the braking surface of the brake drum, in which case the elevator car stays in its position. During a run, current is connected to the electromagnet of the brake and the magnet pulls the brake shoe and the brake pad off the braking surface of the brake drum, in which case the brake is open and the elevator car can move up or down in the elevator hoistway. The brake implementation of an elevator can be e.g. such that the implementation comprises two electromagnetic brakes functioning as the active part, which brakes are disposed outside the rim of a brake drum on opposite sides of the rim of the brake drum to each other as viewed from the front in the direction of the axis of rotation of the brake drum.

There are a number of work phases in the manufacture of an electromagnetic brake. The coil of a brake is manufactured e.g. from glued wire or by winding a copper conductor around a coil former. After this the glued wire/copper conductor of the coil is connected to a supply conductor e.g. by soldering, the supply conductor is threaded out of a machining aperture made in the frame part of the brake, and the machining aperture is sealed. In addition, the supply conductor is tightened and attached to a separate cable clamp, sleeved and connected to a connector fixed to the frame part of the brake.

The joining and connection of the supply conductors occurs as manual work, which creates a quality risk, lengthens the manufacturing time of a brake and increases costs. In addition, the quantity of components needed is quite large, which also has an effect on the reliability of the brake. There is, in fact, a need to simplify the structure of a brake and to raise the degree of automation in connection with the manufacturing process of a brake.

AIM OF THE INVENTION

The aim of the invention is to provide a solution to the aforementioned drawbacks. To achieve this aim the invention discloses an electromagnetic brake according to claim 1 and also a method for manufacturing an electromagnetic brake according to claim 6. The preferred embodiments of the invention are described in the dependent claims. Some inventive embodiments and inventive combinations of the various embodiments are also presented in the descriptive section and in the drawings of the present application.

SUMMARY OF THE INVENTION

The electromagnetic brake according to the invention comprises a coil former, a coil which is fitted on the coil former, and also an electrically connecting part, which is equipped to make an electrically conductive contact between the coil and the power supply cable supplying current to the electromagnetic brake. The aforementioned electrically connecting part is conjoined with the coil former.

In the most preferred embodiment of the invention the electromagnetic brake comprises a frame part and an armature part movably supported on the frame part. In the most preferred embodiment of the invention the coil former, as well as the coil fitted on the coil former, is fitted into the frame part.

In a preferred embodiment of the invention the electrically connecting part is integrated into the coil former preferably in connection with the manufacture of the coil former. In a preferred embodiment of the invention a hole for the cable of the coil is made on the coil former in connection with the electrically connecting part, and the cable of the coil is configured to be connected to the electrically connecting part via the aforementioned hole.

In some embodiments the electrically connecting part comprises one or more fixing means for fixing the electrically connecting part to the coil former. In this case the coil former comprises a fixing interface for receiving the aforementioned one or more fixing means.

In a preferred embodiment of the invention the aforementioned electrically connecting part is supported by the coil former.

In a preferred embodiment of the invention the brake comprises a frame part, and the frame part comprises a housing, into which the coil former, the coil and the electrically connecting part are fitted.

In a preferred embodiment of the invention the aforementioned power supply cable is configured to be connected in connection with the aforementioned electrically connecting part with a counterpart, and the frame part of the brake comprises a cavity for receiving the counterpart. The use of a counterpart facilitates the connection of the power supply cable to the brake e.g. in connection with installation work, servicing work and modernization work.

In a preferred embodiment of the invention the aforementioned cavity is shaped to support the counterpart in the cavity against a force component directed a right angles with respect to this connection direction. In this case the brake does not necessarily need a separate cable clamp for the power supply cable.

In the method according to the invention for manufacturing an electromagnetic brake a coil former is formed and an electrically connecting part is fitted in connection with the coil former such that the electrically connecting part is supported by the coil former. In a preferred embodiment of the invention the electrically connecting part is integrated into the coil former, preferably in connection with the manufacture of the coil former.

In a preferred embodiment of the invention the coil of the brake is fitted on the coil former and the cable of the coil of the brake is connected to the aforementioned electrically connecting part in a manner that conducts electricity.

In a preferred embodiment of the invention a housing is made in the frame part of the brake for the coil former, the coil and the electrically connecting part, a cavity is made in connection with the space intended for the electrically connecting part, which cavity extends from the housing to the surface of the frame part of the brake, for receiving the counterpart of the electrically connecting part, and the coil former, the coil on the coil former and also the electrically connecting part are pressed into position in the housing.

The invention enables an increase in the degree of automation of the manufacture of a brake and easier processability on an automated assembly line. Also the amount of needed components decreases. The coil of the brake, the coil former and the electrically connecting part can be installed in the frame part at the same time in the same pressfit work phase. Furthermore the invention enables a reduction of the machining work of the brake, and in particular of the number of machining directions. The electrically connecting part can be shaped such that standard-type connectors can be used as the counterpart of the electrically connecting part, which standard-type connectors can be connected to the electrically connecting part with standard-type joints. One possible connector type for a counterpart is a connector of the Minifit connector series manufactured by Molex.

By means of the invention the amount of jointing phases, such as soldering phases, in the manufacture of a brake can also be reduced.

Since in the brake according to the invention the electrically connecting part is disposed inside the frame part of the brake, the brake is also better protected from the effect of external forces e.g. during transportation and storage.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1A:
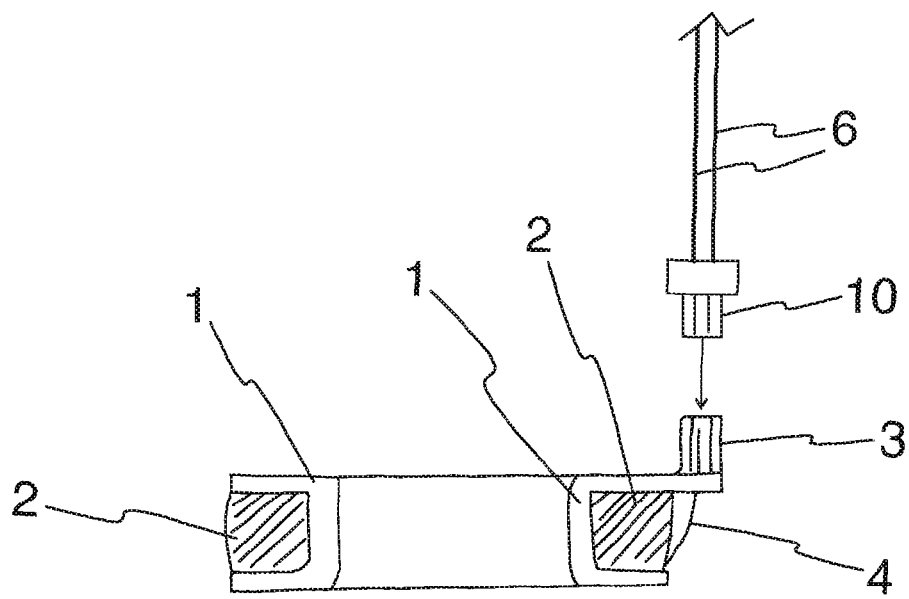
FIG. 1a presents a cross-sectional side view of the combination of a brake coil, a coil former and an electrically connecting part
Figure 1B:
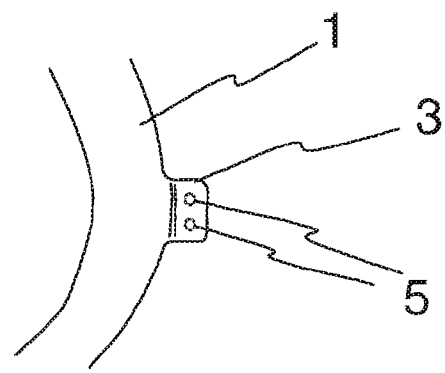
FIG. 1b presents a top view of the electrically connecting part in the coil former according to FIG. 1a FIG. 1c presents a cross-sectional side view of a part of a frame part of a brake according to the invention

FIGS. 1a and 1b present a part of an electromagnetic brake according to the invention. The electromagnetic brake comprises a frame part 7 and also an armature part (not in figure) movably supported on the frame part. Between the frame part of the brake and the armature part are thruster springs (not in figure), which when the brake is activated press the brake shoe/brake pad comprised in the armature part to engage with the object being braked. The brake is opened by supplying direct current to the coil 2 of the electromagnet in the frame part 7 of the brake, in which case the electromagnet pulls the brake shoe/brake pad off the object being braked by resisting the thrusting force of the thruster springs. The current supply to the brake, to the coil 2 of the electromagnet, occurs with power supply cables 6.

As presented in FIG. 1a, the electromagnetic brake comprises a coil former 1, in which the coil 2 of the brake is formed by winding a wire, preferably a copper wire, around the coil former 1. A brake connector 3 is conjoined with the coil former, which brake connector is integrated into the coil former 1 in the manufacturing phase of the coil former such that the coil former 1 and the brake connector 3 are the same piece.

Holes 5 are made in the coil former 1 in connection with the brake connector 3 for the wires 4 of the coil, and the ends of the wires 4 of the coil are connected from below via the holes 5 to the terminals of the brake connector 3 in a manner that conducts electricity, e.g. by soldering or with a crimping connection. The power supply cables 6 of the electromagnet of the brake are connected to the terminals of the brake connector 3 in a manner that conducts electricity with a suitable detachable counterpart 10, in which case the power supply cables 6 can supply current from the power source of the brake via the brake connector 3 to the coil 2.

Figure 1C:
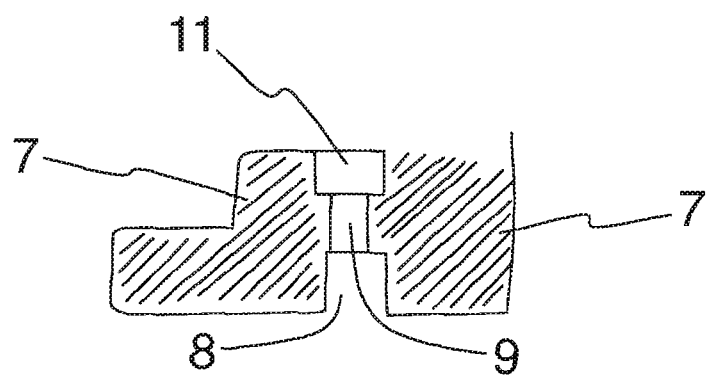

A housing is machined in the frame part 7 of the brake, a part of which housing is presented in FIG. 1c. In the housing is a space 8 for the coil former 1, for the coil 2 on the coil former and also a space 9 for the brake connector. In addition, a cavity 11 for the counterpart 10 of the brake connector 3 is made in the frame part 7, which cavity extends from the housing, from the space 9 intended for the brake connector 3, to the surface of the frame part 7 of the brake. The cavity 11 is shaped according to the counterpart 10 of the brake connector 3 such that the side walls of the cavity 11 support the counterpart 10 in the cavity 11 against a force component directed at right angles with respect to this connection direction (the connection direction of the counterpart 10 is presented with an arrow in FIG. 1a).

The manufacturing of the brake structure described above is particularly advantageous because the amount of components needed is small and the manufacturing can to quite a large extent be automated. When manufacturing the brake, a housing 8, 9 is machined in the frame part 7 for the coil former 1, the coil 2 and the brake connector 3, either from one part or by joining a number of parts to each other; similarly, the cavity 11 needed for the counterpart 10 of the brake connector is made in connection with the housing. After this the separately-manufactured aggregate of the coil 2, the coil former 1 and the brake connector 3 integrated into the coil former is pressed into position in the housing 8, 9 in the pressfit manufacturing phase.

The connection of the power supply cables 6 in the brake can also be implemented without a counterpart 10 e.g. by using a type of brake connector 3 comprising a screw joint for connecting the ends of the power supply cables 6.

The aggregate of the coil former 1, coil 2 and brake connector 3 can also be fixed into position in the housing e.g. by casting in resin.

The invention is suited also to other electromagnetic brakes, in addition to elevator brakes. Such electromagnetic brakes are used e.g. in escalators and travelators, in addition to elevators.

The solution according to our invention is suited to both drum brakes and to disc brakes.

It is obvious to the person skilled in the art that different embodiments of the invention are not only limited to the examples described above, but that they may be varied within the scope of the claims presented below.

The invention claimed is:
1. An electromagnetic brake comprising:
a coil former;
a coil which is fitted on the coil former;

an electrically connecting part, which is equipped to make an electrically conductive contact between the coil and a power supply cable supplying current to the electromagnetic brake; and a frame part including a housing into which the coil former, the coil and the electrically connecting part are fitted, wherein the electrically connecting part is conjoined with the coil former so as to be directly connected to the coil former, wherein the power supply cable is configured to be connected in connection with the electrically connecting part with a counterpart, and wherein the frame part of the brake includes a cavity for receiving the counterpart.

2. The brake according to claim 1, wherein the electrically connecting part is supported by the coil former.

3. The brake according to claim 1, wherein the cavity is shaped to support the counterpart in the cavity against a force component directed at right angles with respect to this connection direction.

4. A method for manufacturing an electromagnetic brake, comprising the steps of:

forming a coil former;

forming an electrically connecting part in connection with the coil former such that the electrically connecting part is supported by the coil former directly on the coil former;

fitting a coil of the brake on the coil former;

connecting a wire of the coil of a brake to the electrically connecting part in a manner that conducts electricity;

making a housing in a frame part of the brake for the coil former, the coil and the electrically connecting part;

making a cavity in connection with a space intended for the electrically connecting part, which cavity extends from the housing to the surface of the frame part of the brake, for receiving a counterpart of a power supply cable for connection to the electrically connecting part; and pressing the coil former, the coil on the coil former and the electrically connecting part into position in the housing at the same time.

5. The method according to claim 4, wherein the power supply cable is connected to the electrically connecting part by the counterpart.

6. The method according to claim 5, wherein an outer diameter of the counterpart is greater than an outer diameter of the power supply cable.

7. An electromagnetic brake comprising:

a coil former;

a coil which is fitted on the coil former;

an electrically connecting part, which is equipped to make an electrically conductive contact between the coil and a power supply cable supplying current to the electromagnetic brake; and a frame part, wherein the power supply cable is configured to be connected in connection with the electrically connecting part with a counterpart, wherein the frame part of the brake comprises a cavity for receiving the counterpart, wherein the electrically connecting part is conjoined with the coil former so as to be directly connected to the coil former, and wherein an outer diameter of the counterpart is greater than an outer diameter of the power supply cable.

* * * * *